US011392509B2

(12) United States Patent
Xu et al.

(10) Patent No.: US 11,392,509 B2
(45) Date of Patent: Jul. 19, 2022

(54) COMMAND MEMORY BUFFER SYSTEMS AND METHODS

(71) Applicant: PetaIO Inc., Santa Clara, CA (US)

(72) Inventors: Changyou Xu, San Jose, CA (US); Fan Yang, Fremont, CA (US); Peirong Ji, San Mateo, CA (US); Lingqi Zeng, San Jose, CA (US)

(73) Assignee: PETAIO INC., Santa Clara, CA (US)

( * ) Notice: Subject to any disclaimer, the term of this patent is extended or adjusted under 35 U.S.C. 154(b) by 0 days.

(21) Appl. No.: 16/996,295

(22) Filed: Aug. 18, 2020

(65) Prior Publication Data

US 2022/0058137 A1 Feb. 24, 2022

(51) Int. Cl.
*G06F 12/1027* (2016.01)
*G06F 12/0873* (2016.01)
*G06F 12/02* (2006.01)
*G06F 11/07* (2006.01)
*G06F 13/42* (2006.01)
*G06F 13/16* (2006.01)

(52) U.S. Cl.
CPC ...... *G06F 12/1027* (2013.01); *G06F 11/0766* (2013.01); *G06F 12/0246* (2013.01); *G06F 12/0873* (2013.01); *G06F 13/1668* (2013.01); *G06F 13/4221* (2013.01); *G06F 2213/0026* (2013.01)

(58) Field of Classification Search
CPC ............. G06F 12/1027; G06F 12/0246; G06F 3/0659; G06F 3/0679; G06F 3/061
USPC ......................................................... 711/154
See application file for complete search history.

(56) References Cited

U.S. PATENT DOCUMENTS

| 4,920,478 | A  | * | 4/1990  | Furuya   | G06F 3/0601  |
|-----------|----|---|---------|----------|--------------|
|           |    |   |         |          | 711/136      |
| 4,980,816 | A  | * | 12/1990 | Fukuzawa | G06F 12/1027 |
|           |    |   |         |          | 711/207      |
| 6,823,427 | B1 | * | 11/2004 | Sander   | G06F 12/0864 |
|           |    |   |         |          | 711/118      |
| 8,140,739 | B2 | * | 3/2012  | Langlois | G06F 12/0246 |
|           |    |   |         |          | 711/103      |
| 8,990,488 | B2 | * | 3/2015  | Haywood  | G06F 3/0659  |
|           |    |   |         |          | 711/104      |
| 2008/0104311 | A1 | * | 5/2008 | Meir    | G06F 3/0611  |
|           |    |   |         |          | 711/103      |
| 2009/0157950 | A1 | * | 6/2009 | Selinger | G06F 12/08  |
|           |    |   |         |          | 711/103      |
| 2009/0172260 | A1 | * | 7/2009 | Olbrich  | G11C 7/1063  |
|           |    |   |         |          | 711/103      |
| 2010/0061133 | A1 | * | 3/2010 | Chen     | G11C 16/10   |
|           |    |   |         |          | 365/63       |
| 2011/0082967 | A1 | * | 4/2011 | Deshkar  | G06F 12/0873 |
|           |    |   |         |          | 711/103      |

(Continued)

*Primary Examiner* — Titus Wong
(74) *Attorney, Agent, or Firm* — Stevens Law Group; David R. Stevens (57) ABSTRACT

Example storage control systems and methods are described. In one implementation, a storage drive controller includes a non-volatile memory subsystem that processes multiple commands. The storage drive controller also includes a controller memory buffer (CMB) memory management unit coupled to the non-volatile memory subsystem. The CMB memory management unit manages CMB-related tasks including caching and storage of data associated with the storage drive controller.

12 Claims, 8 Drawing Sheets

(56) References Cited

U.S. PATENT DOCUMENTS

| | | | |
|---|---|---|---|
| 2014/0215129 A1* | 7/2014 | Kuzmin | G06F 12/0246 |
| | | | 711/103 |
| 2016/0246715 A1* | 8/2016 | Ignatowski | G06F 3/0619 |
| 2017/0160973 A1* | 6/2017 | Tiziani | G06F 3/0625 |

* cited by examiner

FIG. 9

COMMAND MEMORY BUFFER SYSTEMS AND METHODS

TECHNICAL FIELD

The present disclosure relates to systems and methods that provide improved processing for computational storage devices.

BACKGROUND

Advancements in computing technology has increased data storage requirements and the demand for high-performance data storage. Some storage drive controllers include a controller memory buffer (CMB), which is a portion of memory defined as host storage but often located in a storage drive controller. The CMB may be accessed by a system in a manner similar to other system memories. The CMB can also be accessed by a drive controller like other local memories. In some systems, a dynamic random-access memory (DRAM) attached to a storage controller is used for the CMB.

The expansion of computing technology is increasing the demand for high-performance storage, such as computational storage, which increases the demand placed on infrastructure efficiency. Constantly increasing data processing and computing requirements place new challenges on the performance of storage drives. Thus, it is desirable to provide flexible storage control systems that can adapt to future processing requirements.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

The systems and methods described herein include a new approach to storage control systems that include a CMB memory management unit (CMMU). The described systems and methods support, for example, caching, windowing, and virtualization in the CMB. The CMMU manages the various tasks associated with the caching, windowing, and virtualization functions. The described systems and methods are transparent to client systems, support an extended CMB size and support a flexible physical memory allocation.

Figure 1:
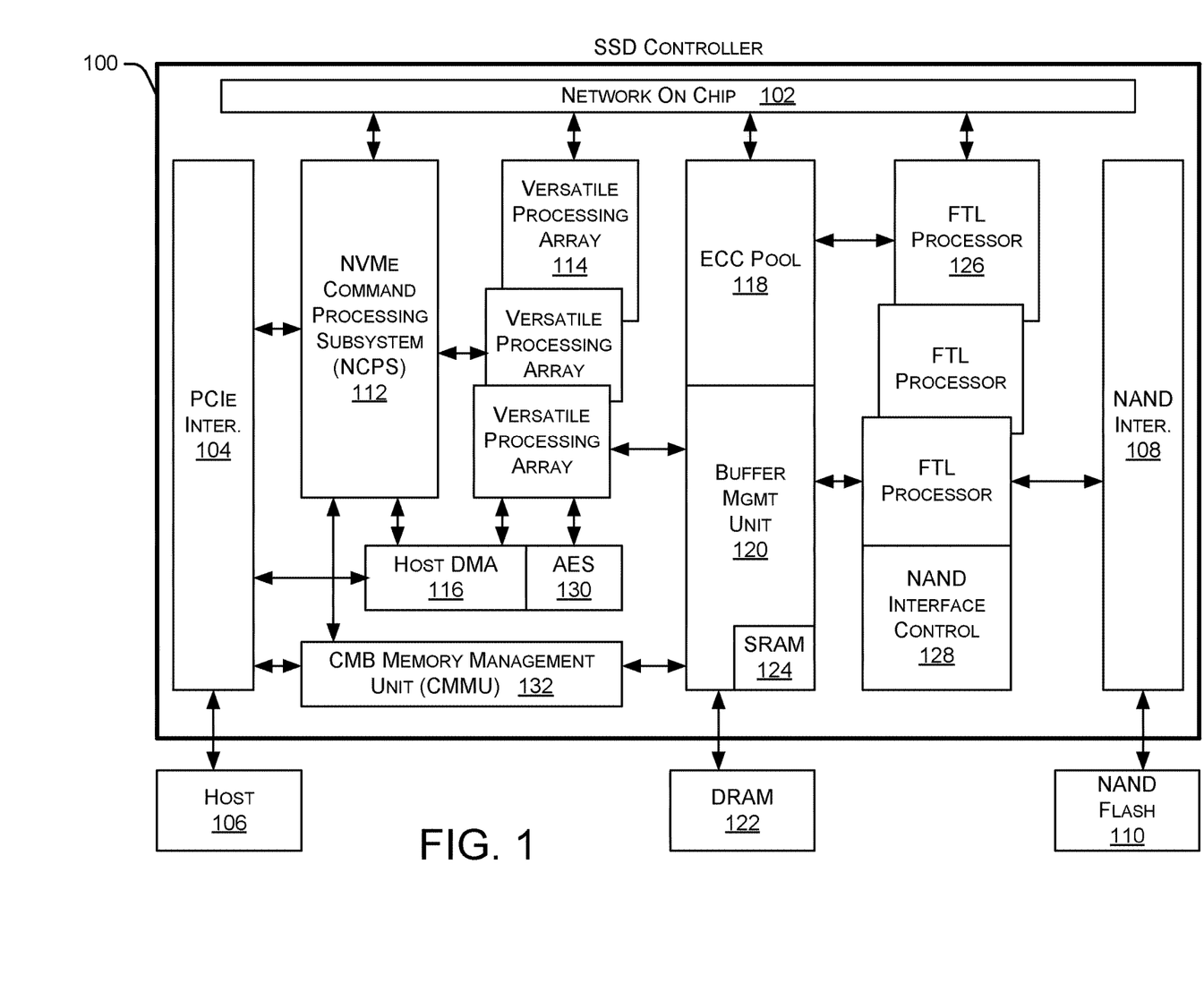
FIG. 1 is a block diagram illustrating a solid-state drive (SSD) controller with a CMB memory management unit (CMMU).

FIG. 1 is a block diagram illustrating a solid-state drive (SSD) controller 100 with a CMB memory management unit (CMMU) 132. As shown in FIG. 1, SSD controller 100 includes a network on chip 102 that allows SSD controller 100 to communicate with other components and devices within SSD controller 100. A PCIe (Peripheral Component Interconnect Express) interface 104 provides an interface to a host 106 as well as a NVMe (Non-Volatile Memory Express) command processing subsystem 112 and a host DMA (Direct Memory Access) module 116. PCIe interface 104 provides a high-speed serial computer bus that supports high-speed communication between the PCIe interface and host 106, host DMA 116, and NVMe command processing subsystem 112.

NVMe command processing subsystem 112 includes a submission and completion queue mechanism. Commands are placed by host software into a submission queue and completions are placed into an associated completion queue. For example, host software places the data processing commands defined by customers into a submission queue and the controller returns the completions after executing the commands. In some embodiments, NVMe command processing subsystem 112 includes multiple CPUs, an inter-processor communication channel, and one or more acceleration engines. Additional details regarding the operation of NVMe command processing subsystem 112 are discussed herein.

In some embodiments, host DMA 116 allows various components shown in FIG. 1 to access memory devices independently of a central processing unit (CPU) or other processor. SSD controller 100 also includes a 3D-VPA 114, which includes multiple versatile processing arrays as shown in FIG. 1. 3D-VPA 114 is coupled to communicate with network on chip 102, NVMe command processing subsystem 112, host DMA 116, a buffer management unit (BMU) 120, and an AES (advanced encryption standard) engine 130. 3D-VPA 114 is a configurable versatile processing array that supports the increased in-situ processing demands of particular systems. 3D-VPA 114 works with NVMe command processing subsystem 112 to process both NVMe commands and vendor unique processing commands (VUPC) simultaneously. By leveraging the extension instruction set from the CPU and the flexibility of an FPGA (Field-Programmable Gate Array) circuit, 3D-VPA 114 can be configured according to a customer's requirements. Additionally, the host software is able to dynamically configure 3D-VPA 114 and change the function of a VPA through vendor unique admin commands (VUAC) before sending the VUPC. 3D-VPA 114 provides seamless interfaces to the NVMe command and data path, which makes the VPA suitable for the host to offload tasks and data in-line processing. Additional details regarding 3D-VPA 114 and its operation are discussed herein. The architecture shown in FIG. 1 can handle a variety of computation tasks, including any number of in-situ processing activities.

As shown in FIG. 1, 3D-VPA 114 is positioned between host DMA 116 and buffer management unit 120. In some embodiments, there are four interfaces between 3D-VPA 114 and the other modules. A command interface between 3D-VPA 114 and NVMe command processing subsystem 112 is used to configure and pass requests to 3D-VPA 114. The vendor unique commands are processed by NVMe command processing subsystem 112 and then passed to 3D-VPA 114. Three data interfaces link 3D-VPA 114 to host DMA 116, AES 130, and buffer management unit 120. This configuration makes 3D-VPA 114 suitable for both host off-load tasks and in-line processing.

An ECC (Error Correction Code) pool 118 is coupled to network on chip 102, an FTL (Flash Translation Layer) processor 126, and buffer management unit 120. On the encoding side, ECC pool 118 reads the user data from buffer management unit 120, generates parity, and sends the data and parity to FTL processor 126 and NAND interface control 128. On the decoding side, ECC pool 118 receives data from FTL processor 126 and NAND interface control 128, then writes the decoded data to buffer management unit 120.

As shown in FIG. 1, buffer management unit 120 includes an SRAM (Static Random-Access Memory) 124. In some embodiments, SRAM 124 stores user data and configuration data for 3D-VPA 114. Buffer management unit 120 is coupled to 3D-VPA 114 and a DRAM (Dynamic Random- Access Memory) 122. In some embodiments, DRAM 122 stores user data and a logic block address to physical block address table. In the described embodiments, DRAM 122 may include a CMB, TLB (translation lookaside block), and a cache, as described herein. Additionally, NAND flash 110 may include CMB backing storage as discussed below.

As shown in FIG. 1, FTL processor 126 includes multiple individual FTL processors, as discussed in greater detail herein. When working with Flash devices, all LBAs (logical block addresses) that represent the logical size visible to and managed by the file system are mapped to a physical location (e.g., block ID, page ID, and sector ID) of the Flash device. As part of the wear leveling and other flash management algorithms (e.g., bad block management, read disturb management, safe flash handling, etc.), the physical location of an LBA might dynamically change frequently. FTL processor 126 may support these activities. FTL processor 126 is coupled to a NAND interface control 128. In some embodiments, NAND interface control 128 manages reading data from NAND Flash 110 via NAND interface 108 and sends the data to ECC pool 118 or FTL processor 126. NAND interface control 128 is coupled to a NAND interface 108, which is coupled to a NAND flash 110. In some embodiments, NAND interface 108 is coupled to multiple NAND flash devices.

New technologies and applications are causing data generation to increase exponentially. Even with a faster PCIe interface 104, the traffic between a system and a storage device is often a bottleneck. CMB was previously added to the NVMe standard and helps reduce traffic from the storage drive interface. To offload some of the computing requirements from the system, SSD controller 100 includes 3D-VPA 114. However, this could add more traffic to the system interface (e.g., PCIe interface 104).

To address this potential data transmission problem and provide more flexibility to host 106, SSD controller 100 includes CMB memory management unit 132. As shown in FIG. 1, CMB memory management unit 132 is coupled to PCIe interface 104, NVMe command processing subsystem 112, and buffer management unit 120. CMB memory management unit 132 is a portion of memory defined as host storage, but is physically located in SSD controller 100. CMB memory management unit 132 can be assessed by the system in a similar manner as other system memories. Additionally, CMB memory management unit 132 can be accessed by a drive controller, such as SSD controller 100, just like other memories. CMB memory management unit 132 manages the mapping of data from a cache to backing storage as well as other functions as described herein. With 3D-VPA 114, in SSD controller 100, a large amount of data may be required to feed the storage controller, which requires allocation of a large CMB space.

In previous systems, where the CMB is part of the DRAM, the size of the CMB is typically limited by the cost of the DRAM and the design complexity for supporting larger DRAM. In the systems and methods described herein, the size of the CMB can be significantly increased by using both DRAM and NAND flash as backing storage. As shown in FIG. 1, CMMU 132 is added and supports various CMB-related tasks as described herein. In some embodiments, a new command/status queue pair is added between CMMU 132 and NVMe command processing subsystem 112, such as the example shown in FIG. 9.

The systems and methods discussed herein add functions such as caching, windowing, and virtualization to the CMB. In some embodiments, CMMU 132 supports and assists with the implementation of the caching, windowing, and virtualization functions provided by the CMB. The functions and benefits provided by the described systems and methods are transparent to the clients. The benefits include, for example, extended CMB size, flexible memory allocation, and the like.

In some embodiments, to fully utilize 3D-VPA 114 and maximize the processing power of the system, larger data chunks may be required from the system. CMMU 132, including the extended CMB size, can support these larger data chunks and provide more memory for the system to facilitate the workload from host 106. CMMU 132 may also balance and/or reduce the traffic on the storage interface. Additional details regarding CMMU 132 are discussed herein.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
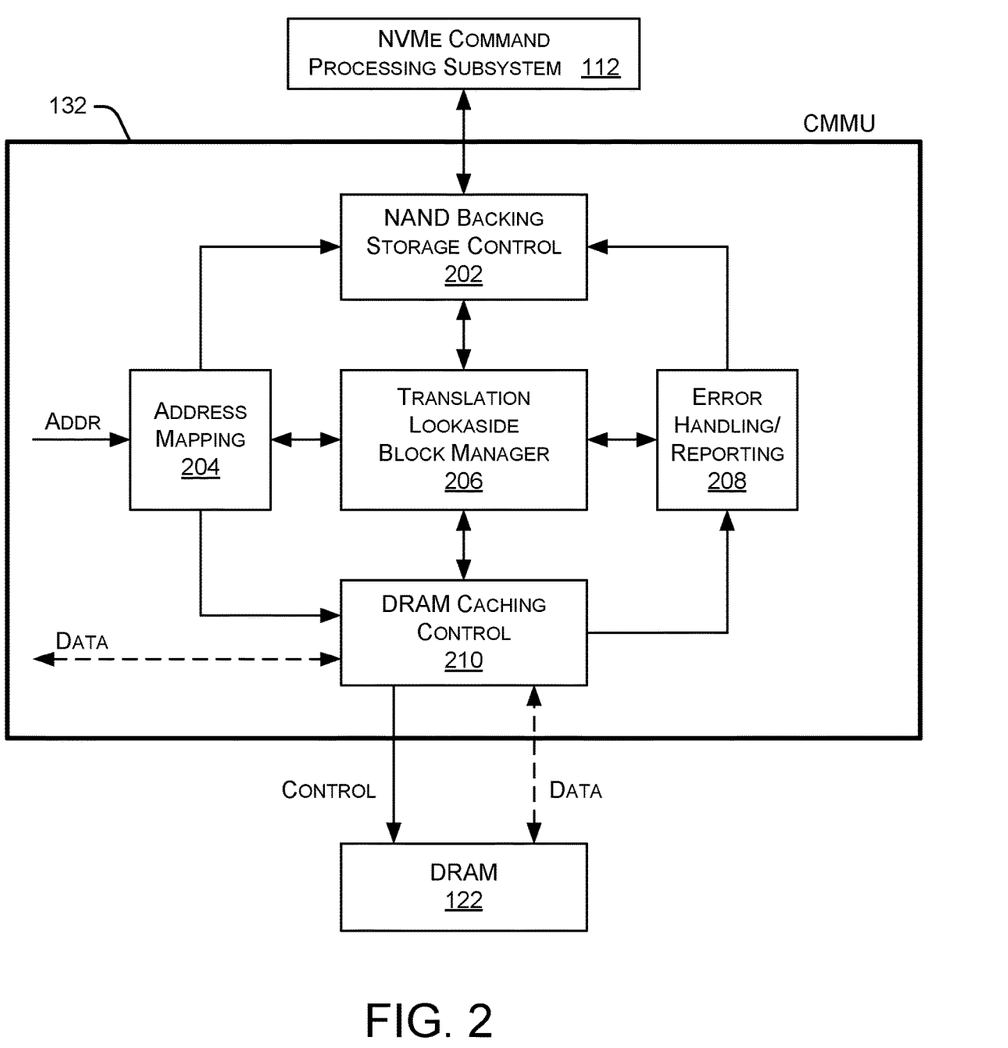
FIG. 2 is a block diagram illustrating an embodiment of an architecture of a CMB memory management unit.

FIG. 2 is a block diagram illustrating an embodiment of an architecture of CMMU 132. A variety of functions may be performed by CMMU 132, such as:

Address mapping with NVMe virtual function support
Translation lookaside block (TLB) management
CMB DRAM caching control
Interface with NVMe request CPU of NVMe command processing subsystem (including 1) write/read command generation based on namespace assigned to CMB, and 2) status from NVMe command processing subsystem).
Error handling/reporting The embodiment shown in FIG. 2 includes a NAND backing storage control 202 coupled to NVMe command processing subsystem 112, discussed herein. NAND backing storage control 202 is also coupled to an address mapping module 204, a translation lookaside block manager 206, and an error handling/reporting module 208. CMMU 132 also includes a DRAM caching control 210 coupled to DRAM 122, address mapping module 204, translation lookaside block manager 206, and error handling/reporting module 208. Address mapping module 204 receives an address and maps the address with NVMe virtual function support. DRAM caching control 210 receives address mapping information from address mapping module 204 and handles the writing and reading of data to/from DRAM 122. DRAM caching control 210 communicates both control signals and data to DRAM 122. The broken lines shown in FIG. 2 represent data paths and the solid lines represent control signal paths.

In the example of FIG. 2, address mapping module 204 maps the address from PCIe BAR (base address register) space to SSD controller internal space. Address mapping module 204 provides the flexibility of the CMB memory allocation. When SR-IOV (single root input/output virtualization) is supported, each function has its own BAR space from the host point of view. All of these memory spaces are managed by the block, so the spaces are treated as flattened space regardless of functions to simplify internal memory access.

Translation lookaside block manager 206 implements the cache status for each cache entry and all cache policies. For example, tasks performed by translation lookaside block manager 206 may include:

1. Keeping track of the status of each entry of the cache. When CMB is accessed, the status of each cache entry is updated based on the operation performed.

2. Provide information related to memory allocation for read/write operations to the CMB.

3. Provide information for cache loading and unloading based on the cache policies.

DRAM caching control 210 provides an interface to DRAM 122 and generates the control/data signals going to DRAM 122. DRAM caching control 210 also captures the data from DRAM 122 based on the interface protocol.

NAND backing storage control 202 is the interface with NAND flash 110 through NVMe command processing subsystem 112. For example, tasks performed by NAND backing storage control 202 may include:

1. Generating LBA based on the namespace and data/block address in the cache. NAND backing storage control 202 may push the LBA and operation (e.g., read or write) information command queue to the NVMe command processing subsystem 112.

2. NAND backing storage control 202 may also receive status information from NVMe command processing subsystem 112 and send information to update the translation lookaside block.

In some embodiments, the data is CRC protected in the design and the memory is ECC protected. The CRC and ECC are checked for errors. If an error is non-fatal or correctable, error handling/reporting module 208 generates and reports a message to NVMe command processing subsystem 112 (via NAND backing storage control 202) and CMMU 132 is locked.

Figure 3:
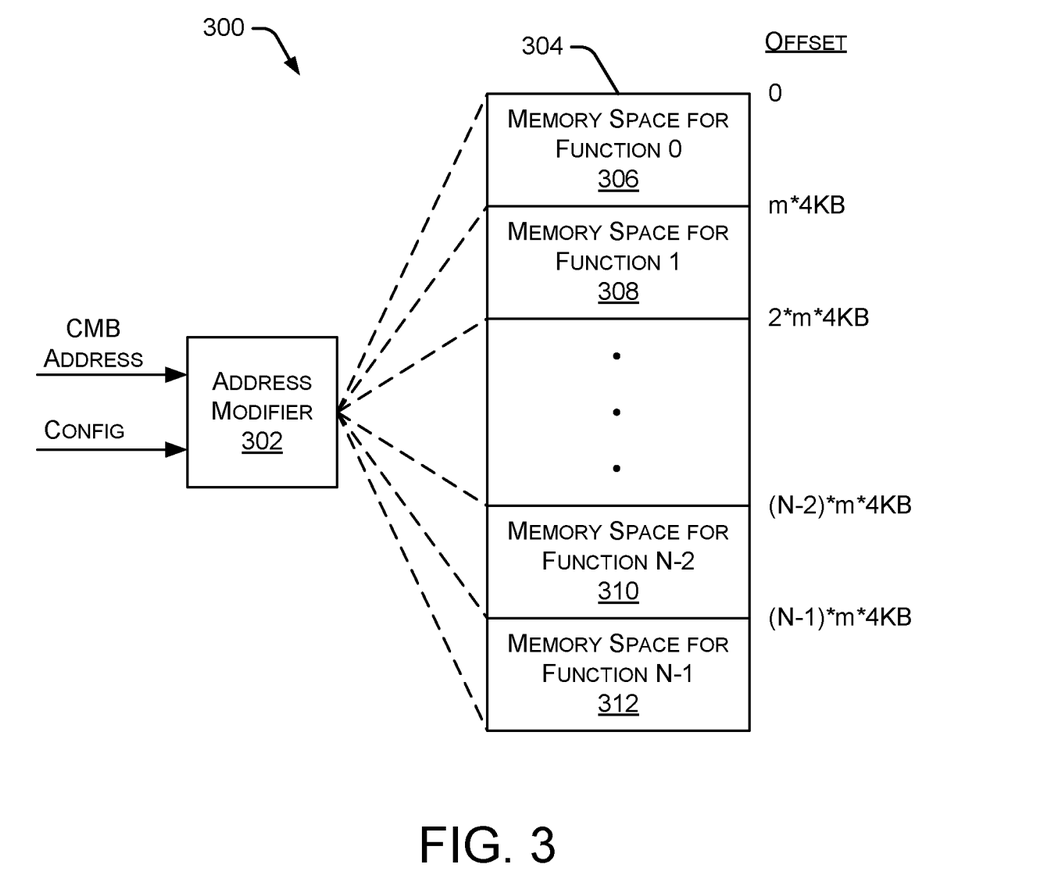
FIG. 3 illustrates an embodiment of an address mapping.

FIG. 3 illustrates an embodiment of an address mapping 300. In some embodiments, CMB access requests from a host or controller are based on BAR (base address register) space. These CMB access requests need to be mapped into local memories. In some embodiments, this mapping is done by address mapping module 204 in CMMU 132. The mapping scheme may support dual-port and virtual functions, such as SR-IOV. This mapping scheme takes the port and function numbers into account when generating the internal addresses. Each function occupies one partition of the memory space. In some implementations, the size of each partition is a multiple of 4 KB.

As shown in FIG. 3, an address modifier 302 receives a CMB address and configuration information from a host, a controller, or other system or device. Address modifier 302 maps the CMB address to a local memory 304, separated into multiple partitions 306, 308, 310, and 312. In some embodiments, the CMB space is held in NAND flash 110 and local memory 304 is in NAND flash 110. Local memory 304 may be separated into any number of partitions. As shown in FIG. 3, the offsets for the partitions 306-312 are at 4 KB intervals. Each partition 306-312 is associated with a memory space for a particular function (Function 0-Function N−1). In the offsets shown in FIG. 3, "m" is an integer indicating that the CMB size is an m-multiple of the 4 KB intervals.

In one implementation, the CMB address is mapped by using the function numbers as the MSBs of the modified address. In some embodiments, the size of the CMB is configurable. For example, the CMB size may range from very small (e.g., a few megabytes) to very large (e.g., several terabytes). The CMB size is typically limited by the NAND space reserved for CMB purposes.

An example of mapping and accessing data in the example of FIG. 3. CMB access steps are described using a 32-bit address in this example:

Configuration:
1. Cache size 256 MB, n=28
2. CMB NAND size 4 GB, N=32
3. block size 16 KB, b=14
4. number of blocks in a set 4, k=2
5. number of sets in cache 4K ($2^{12}$), s=12

Data Transfer Steps (One Example):
1. CMB access with address 0x87654321
2. Mapping to internal address: 0x76543210 (bit[31:0]: 0111_0110_0101_0100_0011_0010_00010000)
3. If the access is a write operation, go to #4, if the access is a read operation, go to #6.
4. Look up the TLB, for set #0x654. If data for the address is in the cache, then the incoming data is written to the same block at address 0x3210, otherwise the data is written to the next available block in location 0x3210.
5. Update TLB corresponding to the block being written.
6. Look up the TLB, for set #0x654. If data for the address is in the cache, then data is fetched from the block at address 0x3210 and returned, otherwise cache is missed, go to #7.
7. Cache loading operation is requested by TLB to NAND backing storage control.
8. NAND backing storage control generates LBA based on the address from TLB, and sends command to the NVMe command processing subsystem.
9. A block of data including the one for address 0x76543210 are loaded into next available cache slot. Status is sent by the NVMe command processing subsystem to the NAND backing storage control through status queue.
10. Status information is sent to TLB by NAND backing storage control, and TLB updates entry for set #0x654.
11. Data is fetched from the block at address 0x3210, and returned.

In some embodiments, the cache unloading process is done on background.

Figure 4:
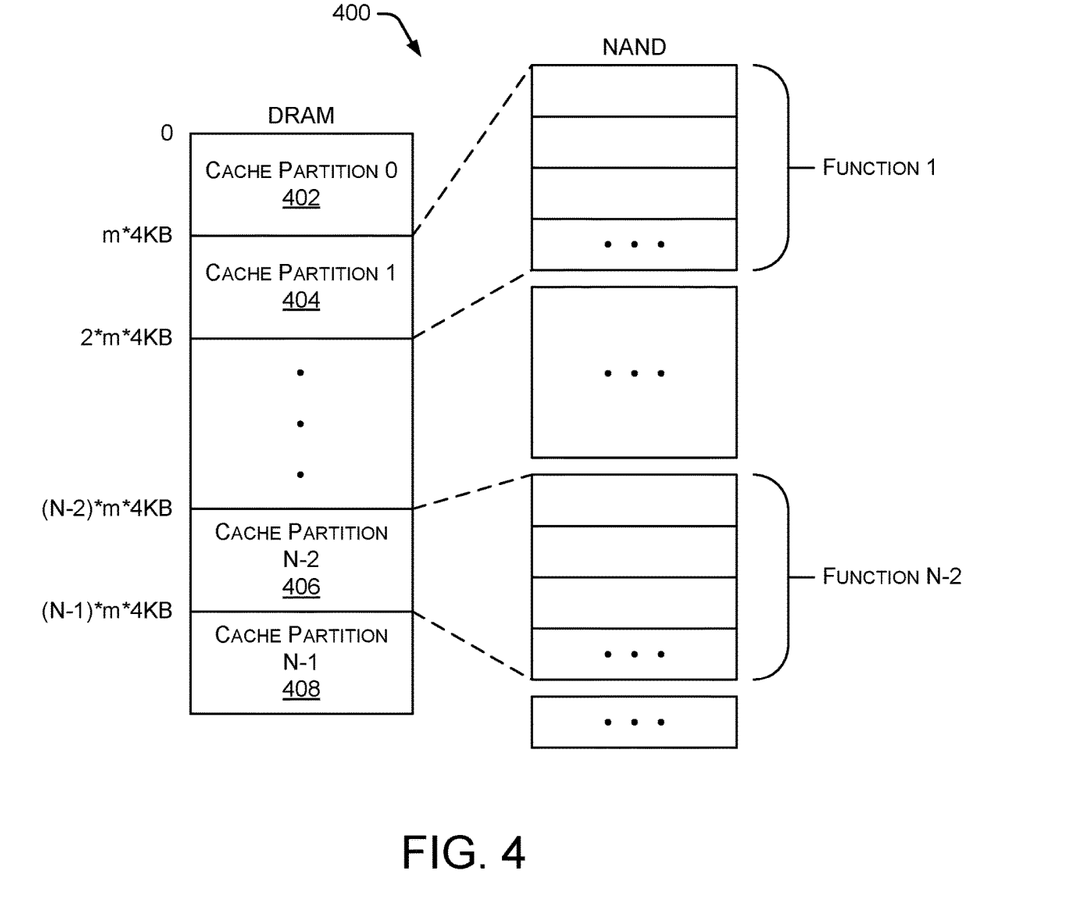
FIG. 4 illustrates an embodiment of a CMB partition layout.

FIG. 4 illustrates an embodiment of a CMB partition layout 400. In some embodiments, both DRAM and NAND flash are used with CMMU 132. In particular implementations, the DRAM operates as a cache and the NAND flash operates as the backing/main storage. Both the cache and backing/main storage are portioned into multiple partitions according to a number of virtual functions. Each DRAM partition corresponds to one function and caches up to one partition of backing storage. In some embodiments, PCIe port and virtual functions are used during address mapping. After the address is mapped, the internal memory is flat without knowledge of the PCIe port and virtual functions. For example, a SSD drive may be used by a host where there are multiple virtual machines running on the host. Each virtual machine uses one SSD function, which is dedicated for that virtual machine.

The data unit handled by CMMU 132 is configurable based on the NAND flash being used. In some embodiments, valid sizes of data units are 4 KB, 8 KB, and 16 KB. Other embodiments may support other data unit sizes. All cache operations, such as write policy, hit/miss check, and the like, are based on the specific data unit. A slot refers to a single unit/block of data being stored.

CMB partition layout 400 shown in FIG. 4, illustrates multiple DRAM partitions 402, 404, 406, and 408. A particular DRAM may be partitioned into any number of individual partitions. As shown in FIG. 4, partition 404 is associated with Function 1 in the NAND flash device and partition 406 is associated with Function N−2 in the NAND flash device. In some embodiments, each function gets the same amount of storage space (e.g., partitions) in the NAND flash device. This configuration simplifies the SSD controller design.

Figure 5:
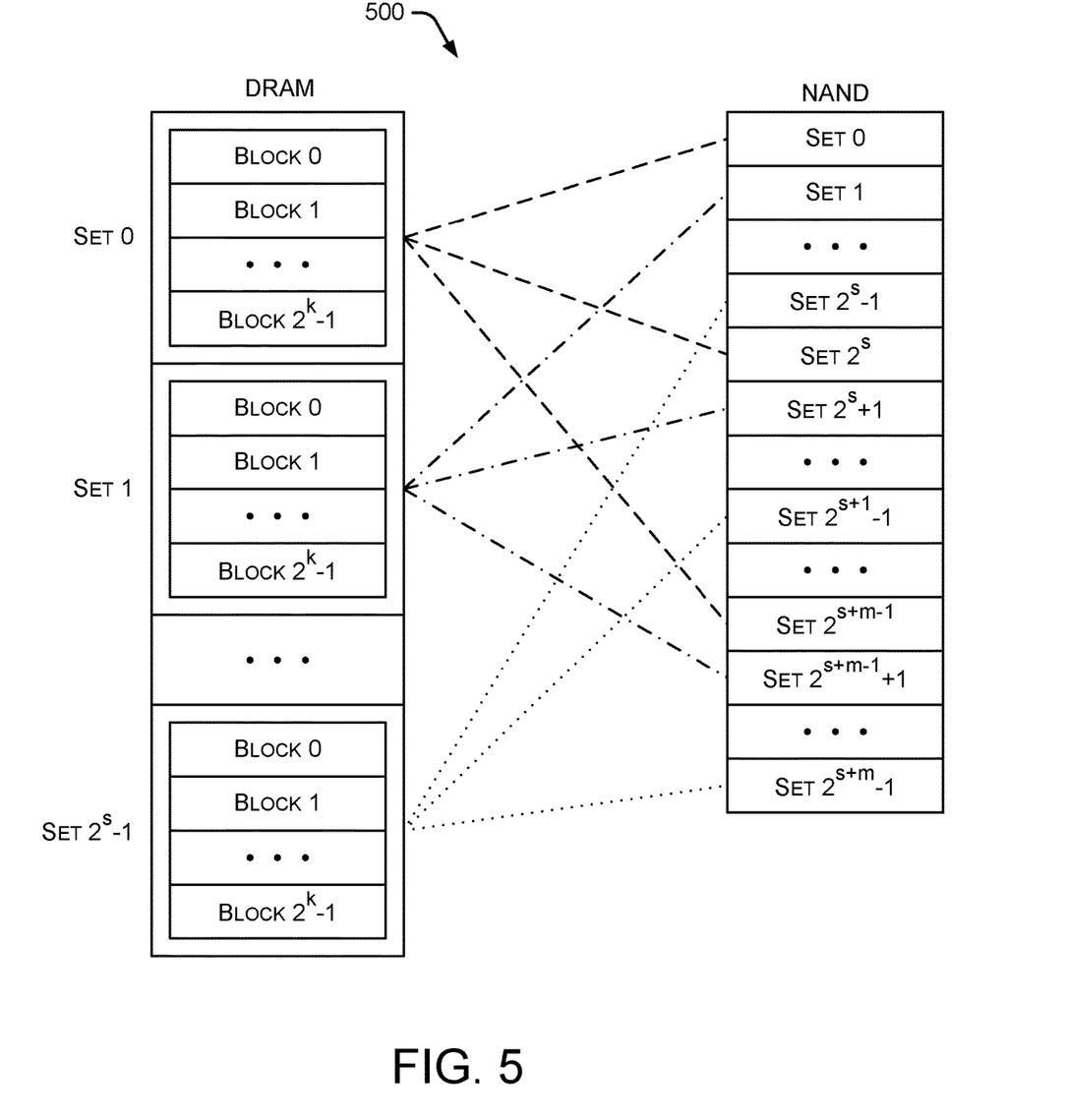
FIG. 5 illustrates an embodiment of a cache set mapping.

FIG. 5 illustrates an embodiment of a cache set mapping 500. To facilitate the design and reduce gate count based on the manner in which CMB is used, a set-associative cache is used for the systems and methods described herein. In some embodiments, the cache memory is divided into sets and there are typically several units/blocks in each set. Direct mapping is used between cache sets and backing storage. The units/blocks inside each set are local and randomly mapped.

In one embodiment, the number of blocks in each set is a power of 2, and is configurable. The variable k represents the number of bits defining blocks in each set as used in the following equation:

$$2^m = \frac{NAND\ CMB\ Size}{Cache\ Size}$$

The cache size is also configurable, where the cache size is primarily affected by the DRAM availability for CMB. The mappings discussed herein are recorded in a translation lookaside block (TLB), which is implemented using SRAM. Thus, the cache size will eventually define the TLB size. In some implementations, the cache size is 256 MB. If the variable n represents the number of bits for cache space, b represents the number of bits for each block, then s is defined as: s=n−b−k. The variable s represents the number of bits to describe the total number of sets in the cache.

In particular implementations, write back is the write policy supported by the described systems and methods due to the property of backing storage. Data from clients is stored in available cache slots and is written to backing storage according to a schedule.

A cache access typically takes 2-3 clock cycles and the conventional main memory can take as many as 12 clock cycles. In many situations, access to the NAND backing memory takes significantly more time than cache access. However, once a cache slot is assigned, it can only be re-used (e.g., overwritten) after the data is moved to a corresponding backing storage. The data sent to the CMB is mostly sequential. Since random cache slot allocation is only happening inside of a set, it may negatively impact performance when a read or write operation is stalled due to a cache miss. To avoid this situation, a watermark in a number of slots is used to keep cache space available any time a cache is needed. For example, in a design with four slots in each set, the systems and methods can set the watermark to 2. When the number of available cache slots is less than 2, the set is marked as RV (replacement valid) and data can be moved to backing storage until the watermark is satisfied. The replacement policy may be implemented in two steps:

1. Determine the set that needs to be replaced.
2. Determine the slow within the set that needs to be replaced.

An MRU (most recently used) replacement policy is used for step 1 above to make space for the ongoing access. A LRU (least recently used) replacement policy is used inside the set for step 2 above.

As shown in FIG. 5, the DRAM is separated into multiple sets, with multiple blocks in each set. The NAND flash has multiple storage locations for multiple sets. In some embodiments, a set is directly mapped from cache to NAND, but the blocks inside a set may be randomly mapped.

Figure 6:
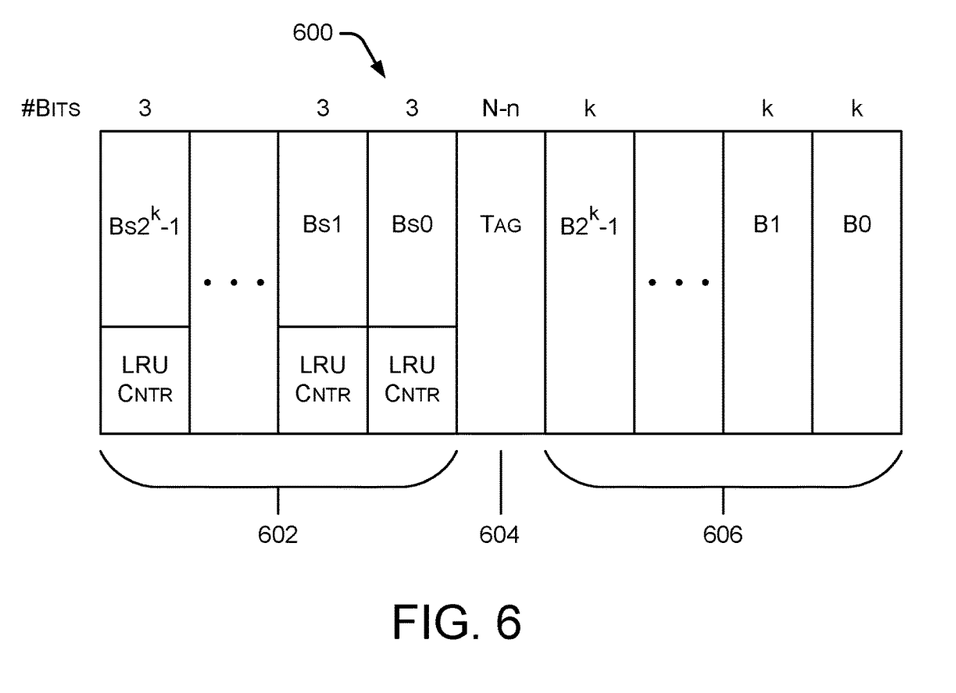
FIG. 6 illustrates an embodiment of a translation lookaside block (TLB) entry format.

FIG. 6 illustrates an embodiment of a translation lookaside block (TLB) entry format 600. To increase the speed of the cache checking process, the mapping table and control information are stored in a local SRAM instead of in the cache entries. In some embodiments, each SRAM entry contains all information for a particular set. The TLB entry format 600 is an example of how the mapping table and control information is stored in an SRAM.

As shown in FIG. 6, TLB entry format 600 includes block status information 602, tag information 604, and address information 606. Block status information 602 includes three bits that represent the status of each block in the entry. Additionally, each of the LRU counters is k bits. A typical number for k is 2 if there are four blocks in each set. There is one LRU counter for each block. An example LRU counter is three bits. In some embodiments, the three bits represent the following status information:

000: empty
001: written/dirty
010: unloading (writing to NAND)
011: unloading (done writing to NAND)
100: loading (read from NAND to cache slot)
1xx: reserved Tag information 604 associates most significant bits to NAND memory, where N is the number of bits for NAND space and n is the number of bits for cache space. Address information 606 includes an address pointing to NAND blocks in a particular set. This information may include a virtual address and/or a physical address. In some embodiments, a set is directly mapped from the cache to NAND. For a cache size of 256 MB, and a NAND size of 1 TB, each set in the cache is mapping to 4096 (1 TB/256 MB) copies. Tag information 604 is the MSB bits to indicate which copy from NAND the cache set is for. The number of bits for address information 606 is k (e.g., 2), which indicates the block inside a NAND copy for the block in the cache set.

The number of blocks in a particular set is typically a small number. In some embodiments, a four-way associative set offers a reasonable design cost with good feasibility and performance. When a system is first powered on, the status bits for each block are initialized to 0, indicating an empty block. Whenever a watermark is reached and a set is selected by the MRU policy, the LRU policy activates to select the slot to be moved to backing storage. In many situations, the LRU policy is only for a few blocks (e.g., four blocks) and the information for all blocks is ready at the same time. Thus, in some embodiments, a simple counter is used for each block to track the usage. In the described situations, k bits for each count will satisfy the requirements.

Figure 7:
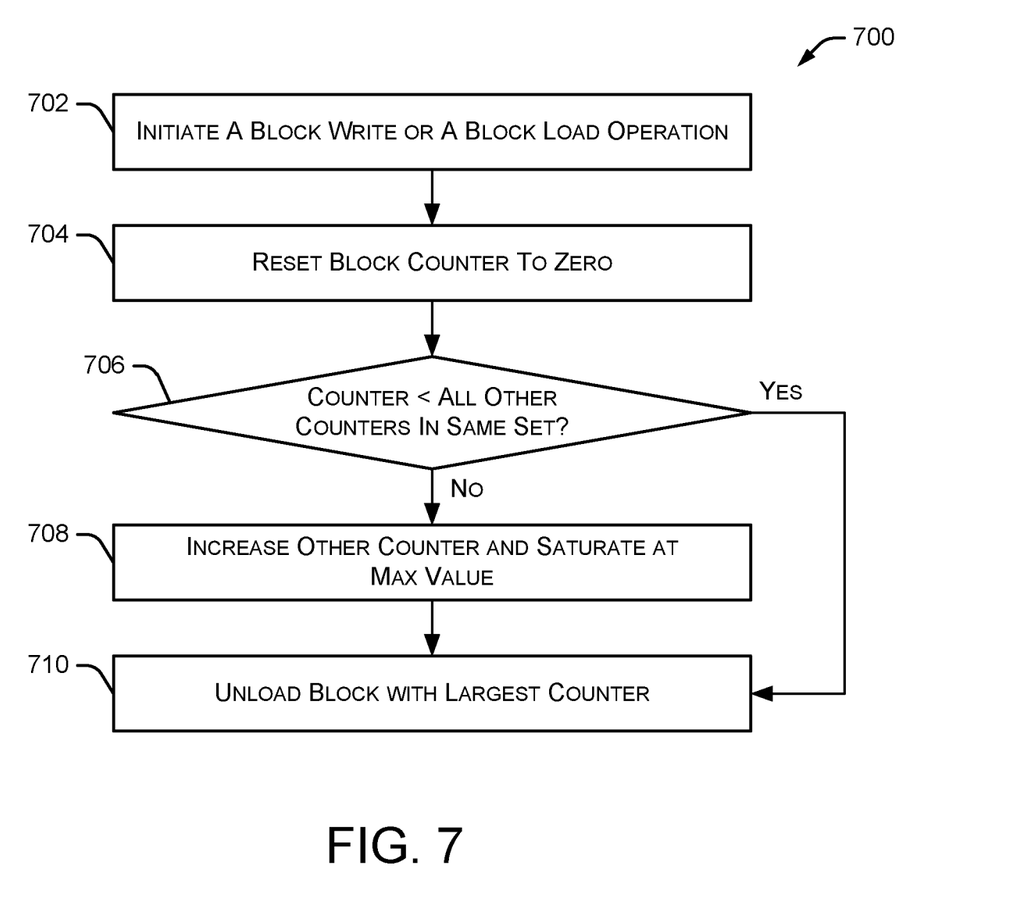
FIG. 7 is a flow diagram illustrating an embodiment of a method for managing a least recently used (LRU) policy.

FIG. 7 is a flow diagram illustrating an embodiment of a method 700 for managing a least recently used (LRU) policy. As shown in FIG. 7, method 700 starts by initiating 702 a block write or a block read operation. The block counter is reset 704 to zero. Method 700 then determines 706 whether a counter is less than all other counters in the same set. If, at 706, the counter is less than all other counters in the same set, the method unloads 710 the block with the largest counter. If, at 706, the counter is not less than all other counters in the same set, the method increases 708 other counters and saturates at max value.

Figure 8:
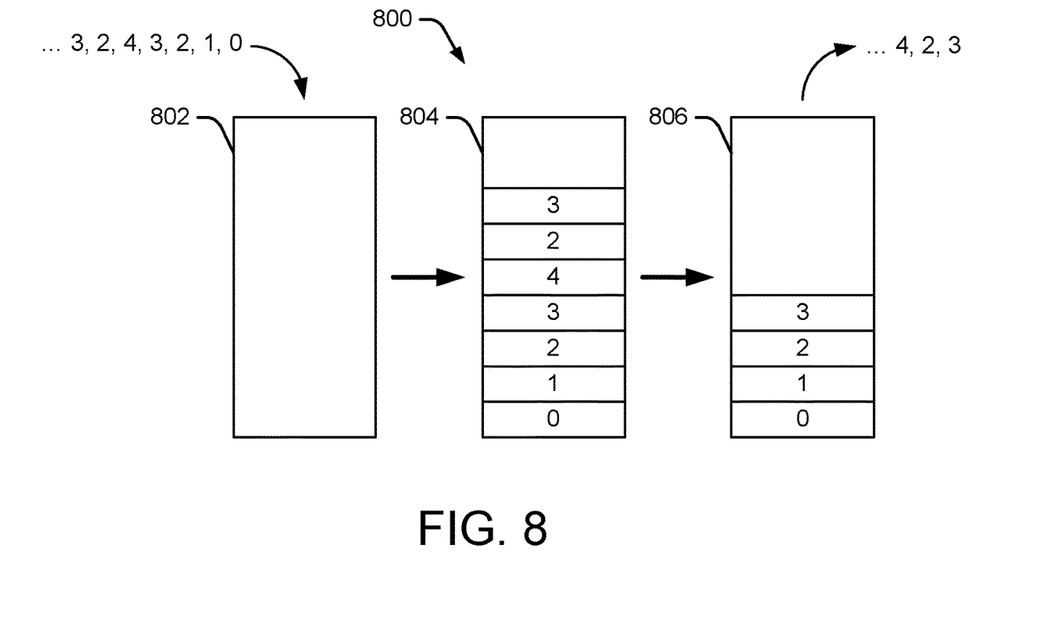
FIG. 8 illustrates an embodiment of a modified most recently used (MRU) policy.

FIG. 8 illustrates an embodiment of a modified most recently used (MRU) policy 800. In some situations, a traditional MRU policy can be costly to implement due to the large number of cache entries. Modified MRU policy 800 uses a simpler approach based on the manner in which the cache and backing storage are used. In some embodiments, the CRB is expected to be written to and read from sequentially, so it is acceptable to go over the watermark and it takes time to move data to backing storage. For this type of data access MRU policy 800 uses a shallow queue-based MRU policy. In some embodiments, the queue is handled as a stack. For example, a new entry is pushed to the stack when a set needs attention. A stack pop is happening when the queue is not empty and hardware resources are available. The queue is a circular array that is controlled by a pointer (e.g., counter). When the queue is full, an upcoming write to the slot will be held until the queue is available again.

As shown in FIG. 8, a sequence of sets "0, 1, 2, 3, 4, 2, 3" is observed regarding cache access. Every set number in the sequence of sets is pushed onto stack 802 regardless of duplications. Stack 804 shows the stack after the sequence of sets is pushed onto the stack. The stack (e.g., cache) is unloaded bases on the set number popped out from the stack. In this example, when the second set number 3 is popped out from the stack, cache unloading will be triggered if the watermark for that set is still valid, otherwise the entry is dropped. Stack 806 shows the stack after popping out "3, 2, 4" from the stack.

Stack loading is triggered when a cache miss occurs. During the time of loading from the NAND flash to the cache, the ongoing cache read is on hold. In some embodiments, both the writing of new data to the cache and loading data from the NAND flash can trigger an MRU-based cache operation.

Figure 9:
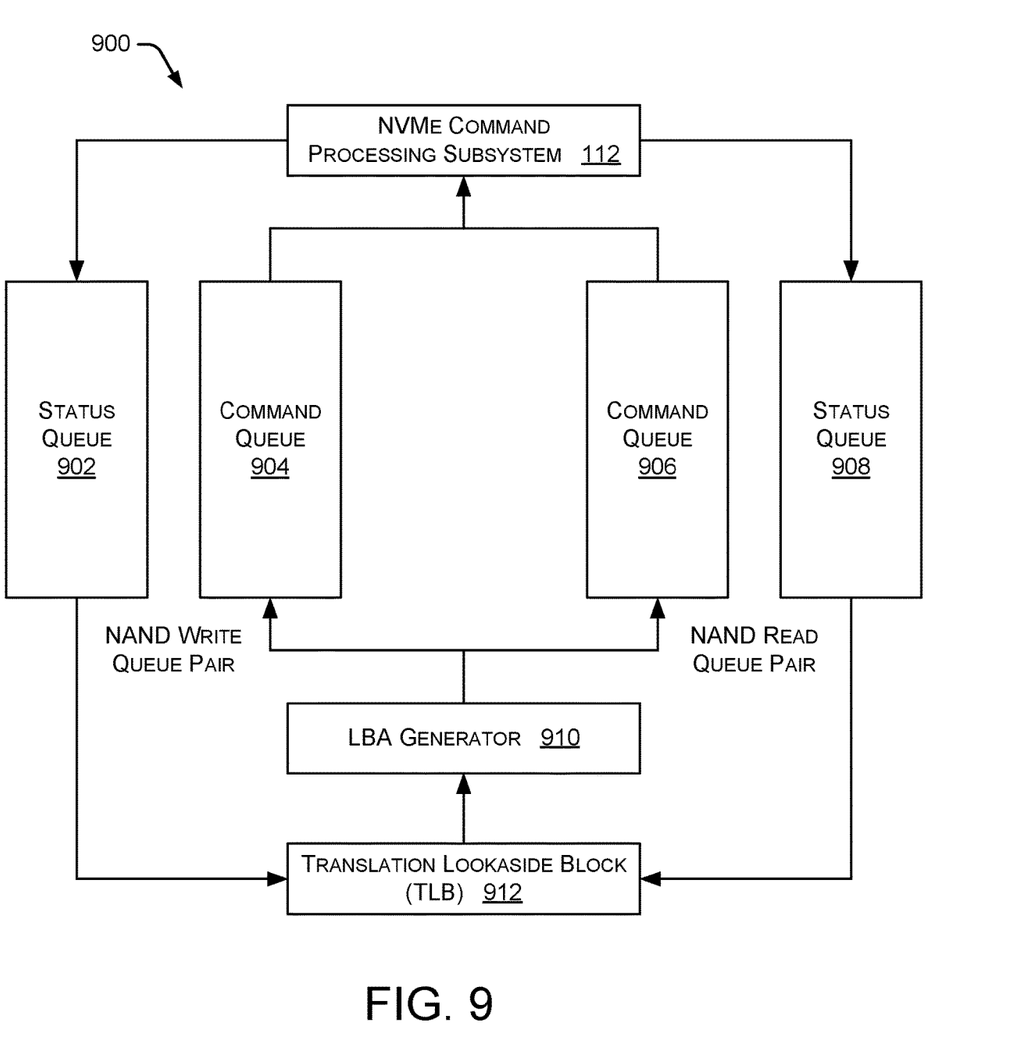
FIG. 9 illustrates an embodiment of a NAND control and request CPU interface.

FIG. 9 illustrates an embodiment of a NAND control and request CPU interface 900. In the example of FIG. 9, NAND access is performed using the existing system and components. A new interface is added between CMMU 132 and NVMe command processing subsystem 112. Two separate queues are illustrated: one for NAND write operations and one for NAND read operations. The use of two separate queues avoids read/write blocking and deadlock situations. The queue for NAND write operations is represented by status queue 902 and command queue 904. The queue for NAND read operations is represented by command queue 906 and status queue 908.

In some embodiments, the NAND access generated by CMMU 132 are pushed into the command queues 904, 906, while the completion information is pushed to status queues 902, 908 by NVMe command processing subsystem 112. In the example of FIG. 9, data is sent to the system through a command queue and is described in LBAs (logical block addresses). A namespace is assigned to the CMB space. An LBA generator 910 generates data descriptors based on CMB block addresses and namespace configuration information. A CMB block is communicated to a buffer inside the NAND after going through SSD controller 100 backend functions. Once the CMB block is inside the NAND, a status is pushed into the status queue to inform CMMU 132 to update the TLB status field. In the example of FIG. 9, translation lookaside block 912 generates the NAND read/ write operation and passes it to LBA generator 910.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A storage drive controller comprising:
a non-volatile memory subsystem configured to process a plurality of commands; and
a controller memory buffer (CMB) memory management unit coupled to the non-volatile memory subsystem, wherein the CMB memory management unit is configured to manage CMB-related tasks including caching and storage of data associated with the storage drive controller with respect to a buffer comprising a first portion in a dynamic random-access memory (DRAM) and a second portion in the non-volatile memory subsystem;
wherein the CMB management unit is programmed to:
receive a read command of the plurality of commands;
translate an address of the read command to obtain a buffer address, the buffer address being an address in a buffer address space referencing a plurality of blocks of data stored in the first portion and the second portion;
evaluate, using a translation lookaside block, whether a block of data of the plurality of blocks of data is in the first portion or the second portion, the block of data including data corresponding to the buffer address;
if the block of data is in the second portion:
obtain a logical block address for the block of data; and
interface with the non-volatile memory subsystem to read the block of data from a physical storage location of the non-volatile memory subsystem corresponding to the logical block address; and
write the block of data to the first portion; and
map the buffer address to an address in the first portion including the block of data and read from the address in the first portion.

2. The storage drive controller of claim 1, wherein the CMB memory management unit is further configured to manage error handling and error reporting.

3. The storage drive controller of claim 1, wherein the CMB memory management unit is further configured to manage read operation requests and write operation requests received from a non-volatile memory express command processing subsystem.

4. The storage drive controller of claim 1, wherein the CMB memory management unit includes:
a dynamic random-access memory caching controller; and
a NAND backing storage controller.

5. The storage drive controller of claim 1, wherein the CMB memory management unit includes a dynamic random-access memory caching controller configured to generate control signals and data communicated to the DRAM.

6. The storage drive controller of claim 1, wherein the CMB memory management unit includes a NAND backing storage controller configured to receive status information from the non-volatile memory subsystem and update information stored in a translation lookaside block.

7. The storage drive controller of claim 1, wherein the CMB memory management unit includes an error handling and reporting module configured to generate error reports and communicate the error reports to the non-volatile memory subsystem.

8. A storage drive controller comprising:
a non-volatile memory subsystem configured to process a plurality of commands; and
a controller memory buffer (CMB) memory management unit coupled to the non-volatile memory subsystem, wherein the CMB memory management unit is configured to manage CMB-related tasks including caching and storage of data associated with the storage drive controller, wherein the CMB memory management unit is further configured to manage a CMB located in a dynamic random-access memory (DRAM) coupled to the storage drive controller, and wherein the CMB memory management unit is further configured to manage backing storage located in a NAND flash memory coupled to the storage drive controller;
wherein the CMB memory management unit is further configured to manage caching of data in the DRAM and the backing storage;
wherein the CMB memory management unit is configured to:
receive a write command of the plurality of commands;
translate an address of the write command to obtain a buffer address, the buffer address being an address in a buffer address space;
evaluate whether a block of data corresponding to the buffer address is in the DRAM using a translation lookaside block;
if the block of data is not in the DRAM:
write the data to an available block of memory in the DRAM; and
if the block of data is in the DRAM, map the buffer address to an address in the DRAM including the block of data and write data from the write command to the address in the DRAM.

9. The storage drive controller of claim 8, wherein the CMB memory management unit includes:
an address mapping module;
a dynamic random-access memory caching controller; and
a NAND backing storage controller.

10. The storage drive controller of claim 9, wherein the address mapping module is configured to map an address from PCIe base address register space to storage drive controller internal space.

11. The storage drive controller of claim 9, wherein the translation lookaside block manager is configured to manage cache policies and a cache status associated with each cache entry.

12. The storage drive controller of claim 9, wherein the dynamic random-access memory caching controller is configured to generate control signals and data communicated to the DRAM.

* * * * *